No. 706,009. Patented Aug. 5, 1902.
N. C. BASSETT.
BELT TIGHTENER.
(Application filed Dec. 5, 1900.)
(No Model.)
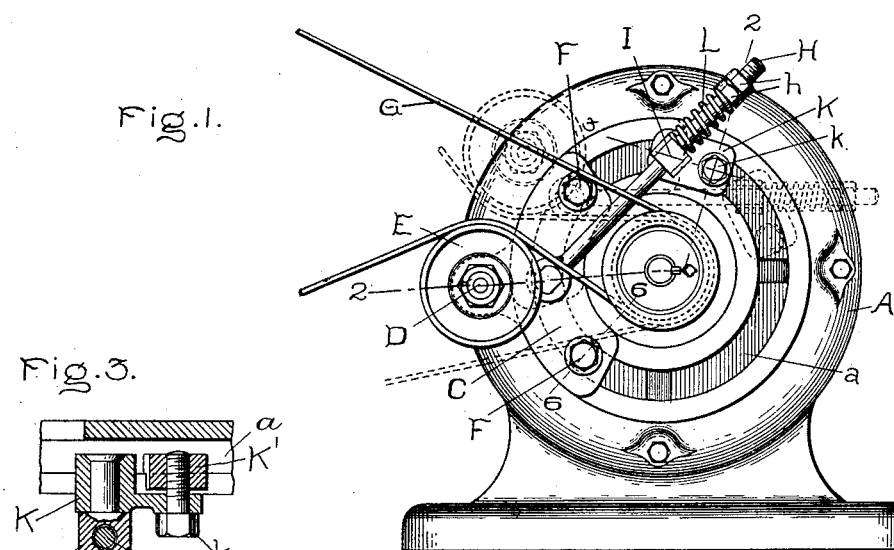
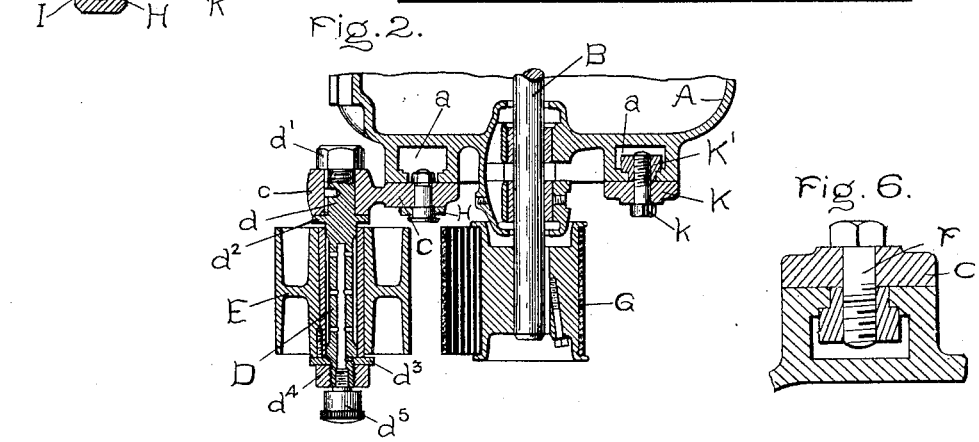
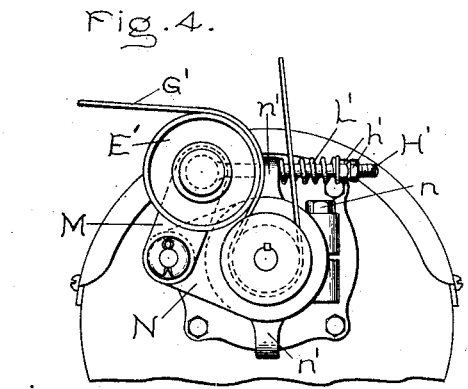
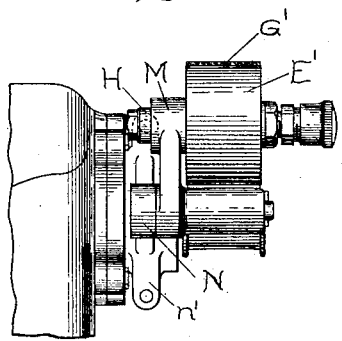
Witnesses:
Frank G. Hattie
Alex H. Macdonald
Inventor:
Norman C. Bassett.
By Albert G. Davis
Atty.

UNITED STATES PATENT OFFICE.

NORMAN C. BASSETT, OF BOSTON, MASSACHUSETTS, ASSIGNOR TO GENERAL ELECTRIC COMPANY, A CORPORATION OF NEW YORK.

BELT-TIGHTENER.

SPECIFICATION forming part of Letters Patent No. 706,009, dated August 5, 1902.

Application filed December 5, 1900. Serial No. 38,718. (No model.)

*To all whom it may concern:*

Be it known that I, NORMAN C. BASSETT, a citizen of the United States, residing at Boston, county of Suffolk, State of Massachusetts, have invented certain new and useful Improvements in Belt-Tighteners, (Case No. 1,841,) of which the following is a specification.

My invention relates to belt-tighteners; and its object is to provide a device of this kind which can be secured to a shaft-bearing and be capable of angular movement to any point around the shaft, so that the belt can be led off at any angle and the tightener be placed on either side of it.

In small electric motors designed to be belted directly to slow-running machines—such as printing-presses, type-setting machines, machine-tools, and the like—it is desirable to use a driving-pulley of very small diameter in order to give a slow-running belt with a comparatively fast-running motor; but in such a pulley the surface in contact with the belt is so short that some device is necessary to wrap the belt around as much of the pulley as possible in order to give sufficient contact with the circumference of the pulley to transmit the power. As these motors may be used in all sorts of situations and positions, a belt-tightener which can be placed anywhere around the pulley-shaft and on either side of the belt is a very useful contrivance. I have therefore shown my invention as applied to an electric motor; but it is to be understood that it can be used in any machine where a belt-tightener of this kind is desirable.

In the accompanying drawings, Figure 1 is an end elevation of a motor equipped with my improved belt-tightener. Fig. 2 is a cross-section on the line 2 2, Fig. 1. Fig. 3 is a detail cross-section on the line 3 3, Fig. 1. Fig. 4 is an end elevation of a modification. Fig. 5 is a side elevation of the same, and Fig. 6 is a sectional view taken on line 6 6 of Fig. 1.

Referring to Figs. 1, 2, and 3, the pulley end of the motor-casing A has formed in it an undercut groove $a$, concentric with the shaft B. The casing is faced off adjacent to the groove to form a bearing-surface for an idler-pulley support C, preferably a segment-plate, which has an arm $c$, in which is inserted a stud D for the idler-pulley E. One mode of constructing the stud is shown in Fig. 2, where the stud has a screw-threaded shank $d$, passing through the arm $c$ and receiving a fastening-nut $d'$, which draws a collar $d^2$ on the stud tight against the outside of the arm. The stud proper is preferably hollow to form an oil-chamber, having lateral ports through which the oil can flow to the pulley-bearings at each end. The pulley is retained in place on the stud by a washer $d^3$ and nut $d^4$. A grease-cup $d^5$ closes the outer end of the oil-chamber. Bolts F pass through the ends of the plate and have T-heads, Fig. 6, engaging with the undercut groove $a$, so that the plate can be slid along the groove around the shaft to any desired position. If desired, the bolts F can be used to hold the plate in place when adjusted; but I prefer to provide means for causing the idler-pulley to exert a constant yielding pressure on the belt. Such means may consist of the mechanism shown, which is as follows: A rod H is pivoted to the plate C and passes loosely through an eyebolt I, pivoted in a block K, which is adapted to slide in the groove $a$, and has a clamping-bolt $k$ entering a T-shaped piece K' inside the groove. A spring L encircles the rod beyond the eyebolt, which serves as an abutment against which the spring is compressed to the proper tension by the nuts $h$. The block K having been firmly clamped in position, the spring will exert a constant but yielding pull on the plate C, the clamping-bolts F and T-heads for which being arranged to leave it free to slide back and forth in the groove under the varying pressure of the belt G.

In the modification shown in Figs. 4 and 5 the idler-pulley E' is carried on the end of the link M, pivoted to a split arm N, which can be tightly clamped upon the shaft-bearing by means of a bolt $n$ passing through said arm. A perforated lug $n'$ projects from each side of the arm, and through one or the other of them passes a rod H', pivotally connected with the link M and having a tension-spring L' abutting against the lug and adjustable by nuts $h'$. The arm can be swung around the shaft-bearing to any desired angular position and firmly clamped there, thereby enabling the belt to be led off at any angle. The idler-pulley E' can be placed on either side of the belt G' by swinging the link from one side of the arm to the other and passing the rod H' through the adjacent lug n'.

It will be seen that with either of these devices the belt can be led off at any angle and the idler-pulley arranged to bear on either portion of the belt. The construction is simple and compact, and since the idler-pulley stands close to the driving-pulley the belt is held in contact with a large arc of the circumference of even a very small driving-pulley.

What I claim as new, and desire to secure by Letters Patent of the United States, is—

1. In combination, a shaft, an idler-pulley, a support for the pulley which is concentrically adjustable around the shaft, a second support also concentrically adjustable about the shaft, and a spring located between the pulley and the second support and acting on the pulley in a manner to keep the belt tight.

2. A belt-tightener mounted adjacent to a shaft, means whereby it can be adjusted concentrically with reference to said shaft, and means for exerting a spring-pressure on said tightener in any angular position to which it is moved.

3. A belt-tightener comprising an idler-pulley, a support for said pulley adjustable to any angular position with reference to the driving-pulley, and a spring-actuated rod attached to said support.

4. The combination with a movable idler-pulley, of a spring-actuated rod attached thereto, a support for the pulley which is movable bodily, and a movable support for said rod.

5. The combination of a driving-pulley, of an idler-pulley, a movable support for the idler-pulley, a rod pivoted to said support, an adjustable abutment through which said rod passes, nuts on the rod, and a spring compressed between the abutment and said nuts.

6. The combination with a driving-pulley and its shaft, of a bearing therefor containing a groove concentric with the shaft, a plate adjustable along said groove, an idler-pulley supported by said plate, and a spring which tends at all times to hold the pulley against a belt.

7. The combination with a driving-pulley and its shaft, of a bearing therefor containing a groove concentric with the shaft, a plate adjustable along said groove, an idler-pulley supported by said plate, a block also adjustable along the groove, and a yielding connection between the plate and the pulley.

8. The combination with a driving-pulley and its shaft, of a bearing therefor containing a groove concentric with the shaft, a plate adjustable along said groove, an idler-pulley supported by said plate, a block having a clamping-bolt engaging with the groove, and a spring-actuated rod pivotally attached to the plate and to the pulley.

9. The combination with an electric motor having an undercut groove in its casing concentric with the shaft, of a segment-plate adjustably mounted in the groove, bolts for connecting said plate with said grooved casing, an idler-pulley mounted on said plate, a block having a clamping-bolt engaging with said grooved casing, an eyebolt pivoted in the block, a rod pivoted to the plate and passing through the eyebolt, a spring on the rod, and means for compressing it against the eyebolt.

In witness whereof I have hereunto set my hand this 3d day of December, 1900.

NORMAN C. BASSETT.

Witnesses:
DUGALD McK. McKILLOP,
JOHN J. WALKER.